United States Patent [19]

Duffy, et al.

[11] Patent Number: 4,835,819
[45] Date of Patent: Jun. 6, 1989

[54] COATED FASTENERS AND PROCESS FOR MAKING THE SAME

[75] Inventor: Richard Duffy, Utica; Gregory A. Fruehe, Joseph R. Dudley, both of Mt. Clemens, all of Mich.

[73] Assignee: Nylok Fastener Corporation, Rochester, Mich.

[21] Appl. No.: 913,339

[22] Filed: Sep. 30, 1986

Related U.S. Application Data

[63] Continuation-in-part of Ser. No. 907,582, Sep. 15, 1986, Pat. No. 4,775,555.

[51] Int. Cl.⁴ .......................... B05D 1/02; B05D 3/02; F16B 37/00
[52] U.S. Cl. .................................... 427/195; 118/308; 411/428; 411/903; 427/318; 427/425
[58] Field of Search ............... 10/108, 86 A; 118/308, 118/313, 318, 319, 620; 427/195, 233, 234, 236, 239, 318, 425; 252/12.2; 411/428, 914, 903, 908

[56] References Cited

U.S. PATENT DOCUMENTS

| | | | |
|---|---|---|---|
| 3,069,387 | 12/1962 | Allen et al. | 411/914 X |
| 3,814,156 | 6/1974 | Bachmann et al. | 411/428 X |
| 4,000,982 | 1/1977 | Ueda | 252/12.2 X |
| 4,080,233 | 3/1978 | McCloskey et al. | 252/12.2 X |
| 4,100,882 | 7/1978 | Duffy et al. | 118/308 X |
| 4,114,505 | 9/1978 | Loeser | 411/903 X |
| 4,626,365 | 12/1986 | Mori | 252/12.2 X |

*Primary Examiner*—Michael R. Lusignan
*Attorney, Agent, or Firm*—Niro, Scavone, Haller, Niro & Rockey, Ltd.

[57] ABSTRACT

A fastener, and a process and apparatus for coating fasteners, in which a resin type material is applied to the fastener is disclosed. A stream of resin type material is directed to each fastener and the threads of each of the fasteners, the threads may be covered over an arcuate variable length including complete 360° coverage. The resin type material applied may be a masking material, a lubricating material and/or an insulating material enabling an accurate and consistent torque-tension characteristic to be maintained during coupling of the fastener in a variety of post-processing environments. Furthermore, the resin type material applied to the fastener is substantially resistant to the deposition of corrosion resistant or preventative materials.

30 Claims, 10 Drawing Sheets

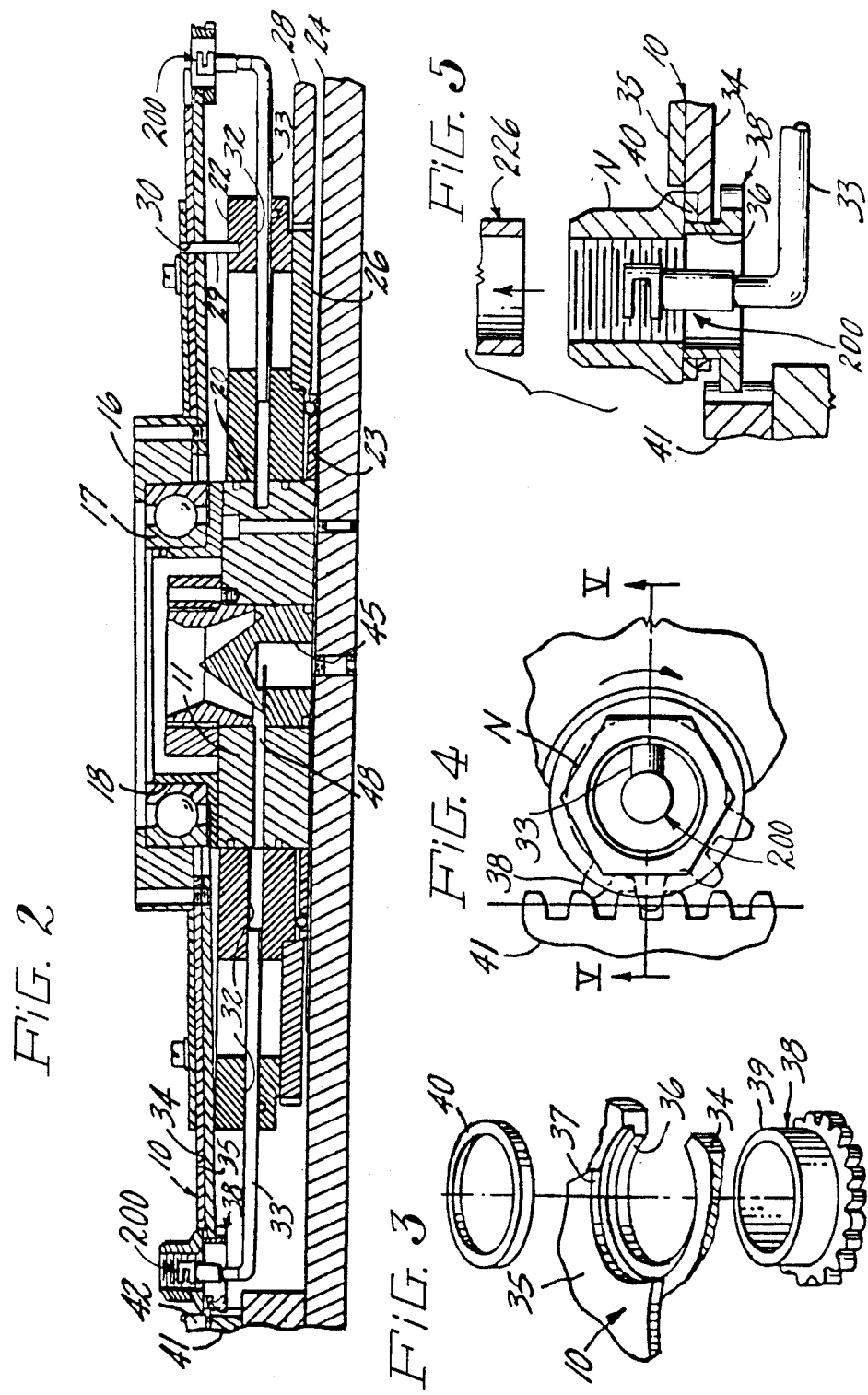

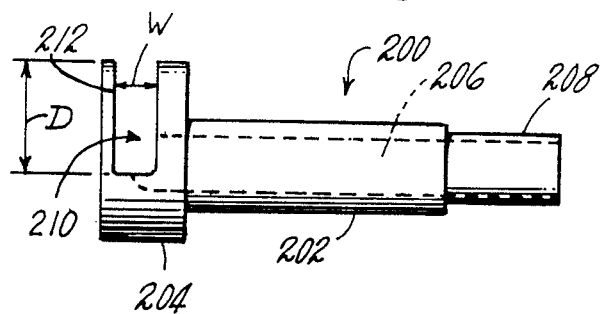
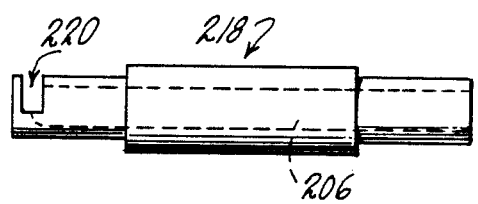
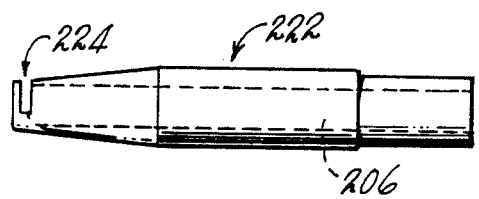
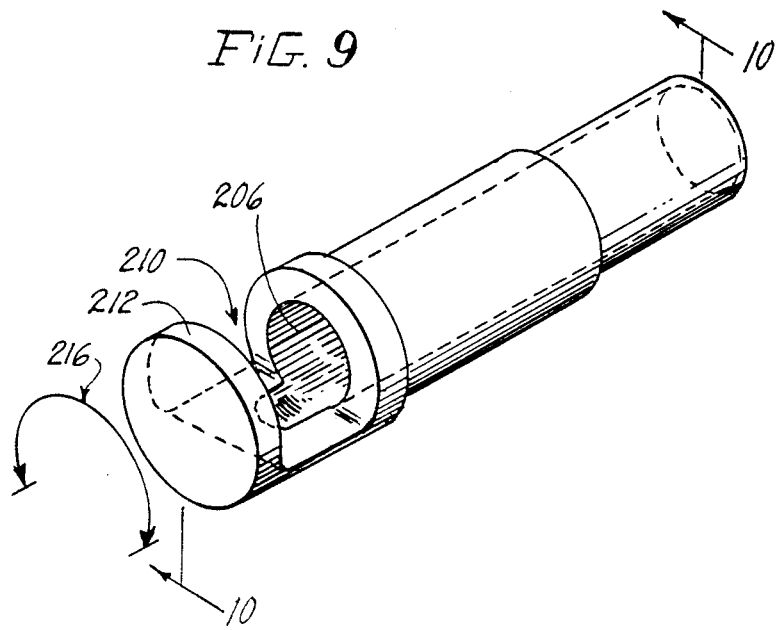

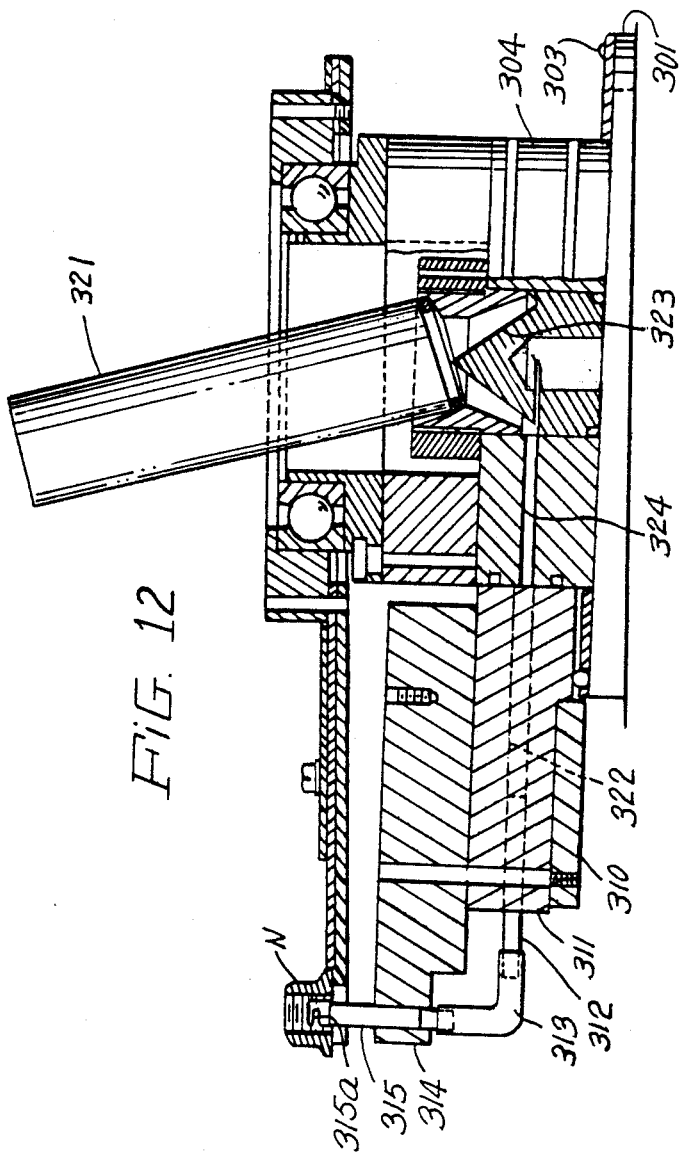

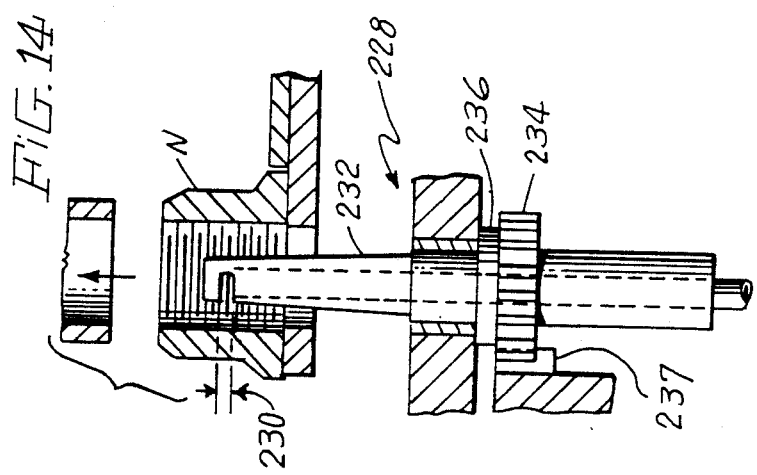
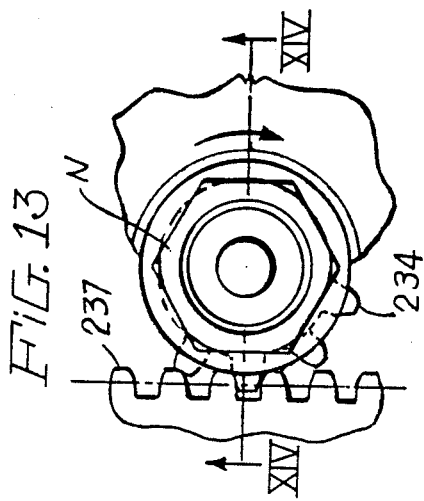

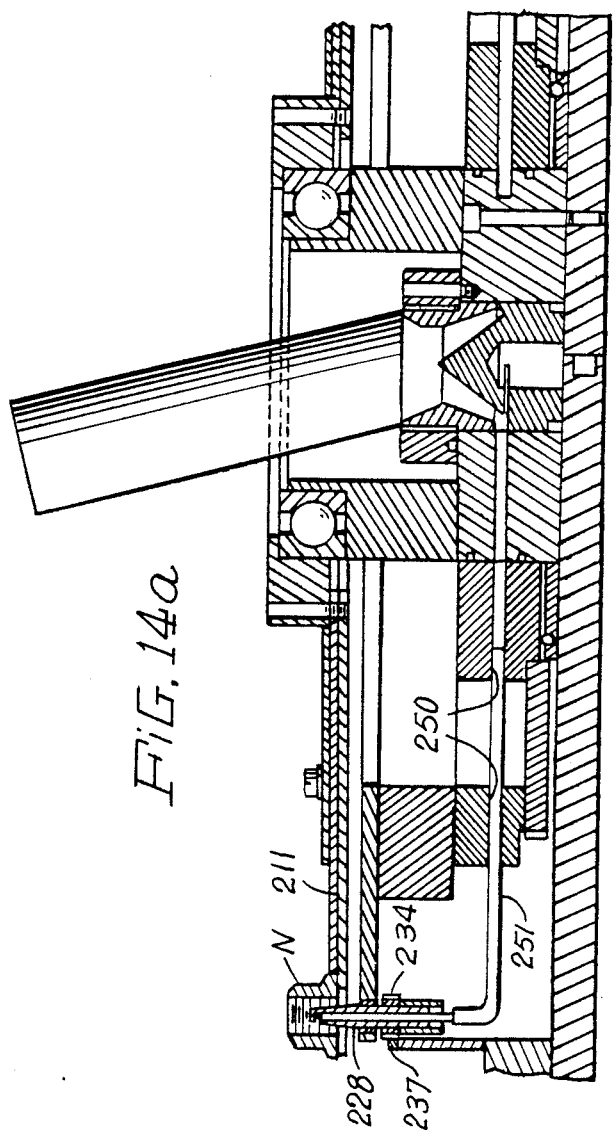

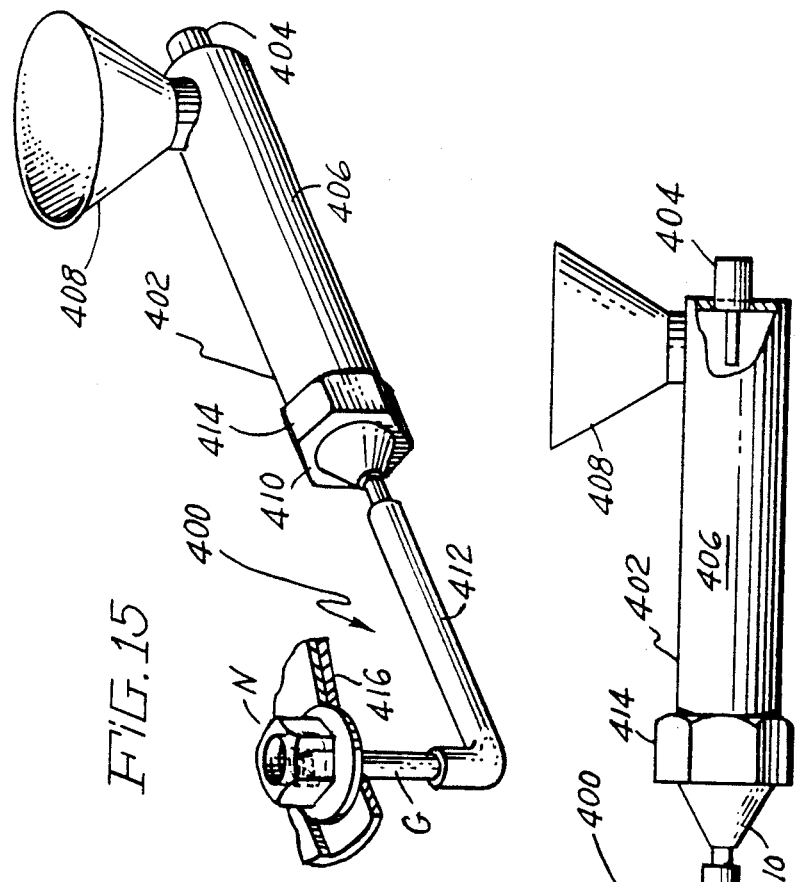
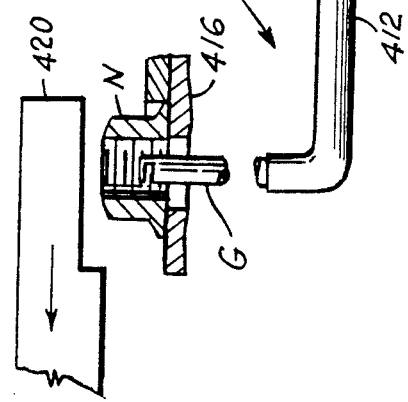

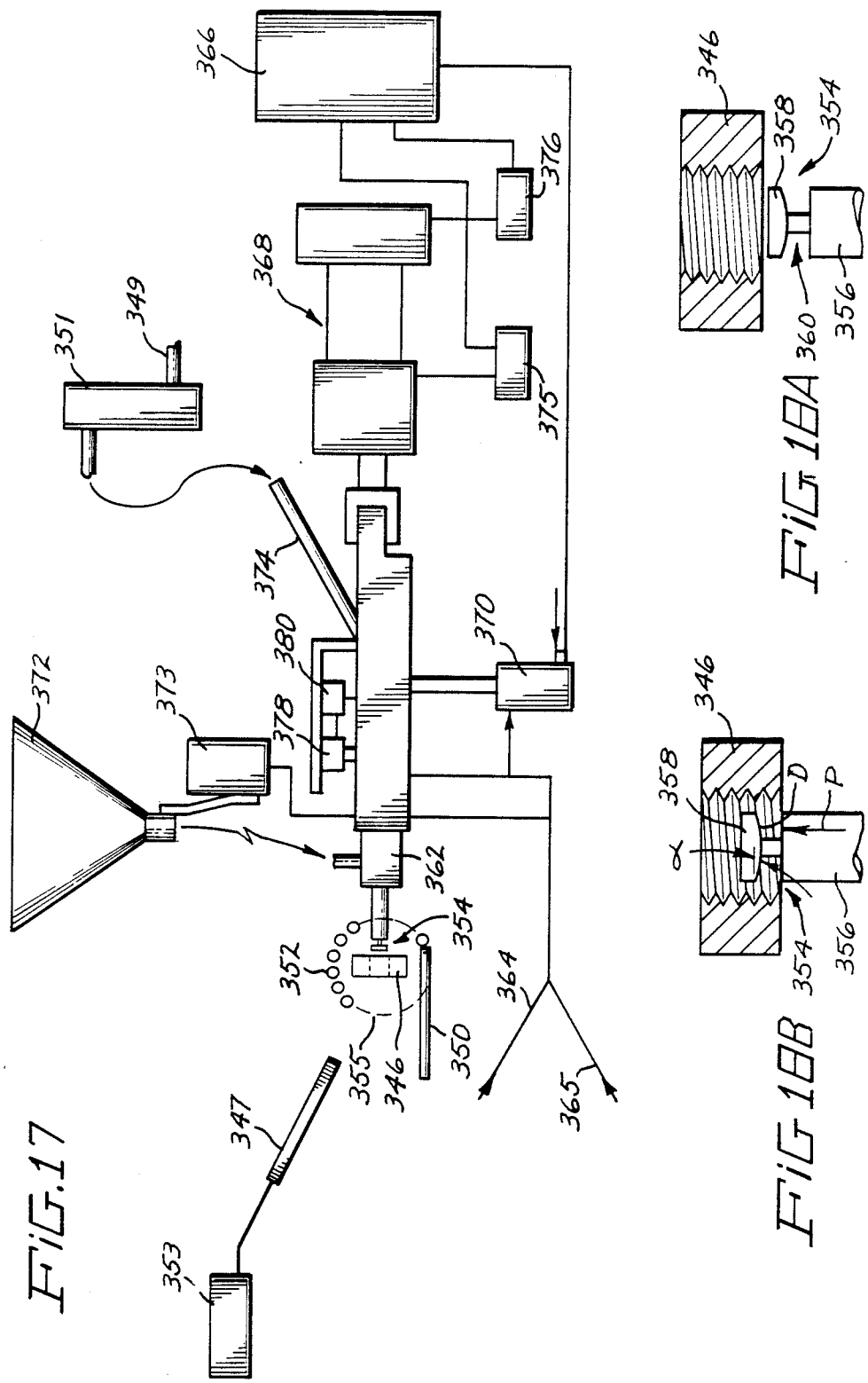

COATED FASTENERS AND PROCESS FOR MAKING THE SAME

This application is a continuation in part of an earlier application having Ser. No. 907,582, filed Sept. 15, 1986, now U.S. Pat. No. 4,775,555, patented Oct. 4, 1988.

The present invention generally relates to an improved product and an improved process and apparatus for the manufacture of threaded elements having a useful coating or patch applied to the threads. More particularly the invention relates to a method and apparatus for the manufacture of fastener elements wherein a patch is deposited on the threads for selected portions ranging from a small patch to complete coverage of all the threads.

In prior art patents there are disclosed various methods and apparatus for applying locking patches of resilient resin to threaded articles. In the devices disclosed in these patents, generally a rotatable table or transport belts are disposed for receiving fasteners and transporting them through a plurality of stations to effect application of the patch to the threads of the threaded articles, or the fastener elements.

U.S. Pat. Nos. 4,054,688 and 4,100,882 are directed to forming patches on fasteners whereby a portion of the heat fusible resin particles is deposited on one area of the hot threads of an element, and thereafter the resin particles are deposited on an additional area of the threads to produce two distinct patches at a desired location. In each of the aforementioned patents, internally threaded articles are retained on a rotatable support member in a selected position by means of a slot which receives a portion of the external surface of a hex head nut. After a descrete patch is applied to the internal threads of the fastener, a turning moment is applied to the fastener to move it such that a different external portion of the threads of the hexagonal element is received by the slot, after which a second discrete patch is applied to the threads of the fastener.

U.S. Pat. No. 3,858,262 is directed to a method and apparatus for making a self-locking threaded element which avoids the difficulties of resin deposit on the end faces of the threaded element and is effective to deposit resin on the selected threads with a minimum of spatter on other portions of the threads. In that method and apparatus as disclosed, a nut or other internally threaded member is heated. While the nut is mounted with its axis in an up-and-down position, the internal threads are sprayed with finely divided resin particles which are caught and built up on the heated surface to form a plastic body.

U.S. Pat. No. 3,894,509 is directed to an apparatus and method for mass production of internally threaded elements, including an automatic means to move a succession of the internally threaded elements through various stations in which the elements are loaded onto a coveying and treating member. A resilient resin locking patch is formed on the threaded surface of the elements by deposition of heat fusible resin powder and thereafter, the elements are umloaded.

U.S. Pat. No. 3,416,492 and 4,366,190 are directed to methods and apparatus wherein a self-locking internally threaded element is manufactured having a locking body of resilient resin provided over three hundred sixty degrees of arc of a portion of the internal threads.

Although substantial progress has been achieved in the above patents, it has become desirable to have an improved method and apparatus which provides for superior control of the size, shape and type of resin deposit or patch application, including the area of the deposit, shape of the resin spray deposited on the threads, improved reduction of spatter and improved flow and efficient application of the resin powder. While the present invention will be described particularly with respect to applying to threaded articles various heat softenable resin particles and Teflon (a registered trademark of Du Pont Corp.), it is to be understood that the apparatus and process of the present invention can be utilized to apply to the threads a variety of "resin type materials", including but not limited to thermoplastic resins, thermoplastic resin compounds, thermosetting resins such as epoxy resin, and Teflon type compounds, as well as other plastic type and fluorocarbon materials.

It is therefore an object of the present invention to provide an improved method and apparatus for the manufacture of threaded articles or fastener elements wherein a functional resin type material is deposited onto the threads of the threaded article.

A further object of the present invention is to provide an improved method and apparatus for the manufacture of internally threaded elements wherein improved control of the application of the resin type material is obtained over a desired arcuate and vertical area of the internal threads of the article.

It as an additional object of this invention to provide a threaded article having a coating which provides masking, lubricating and/or insulating of the article and the threads of the article.

A still further object of the invention is to provide a novel spray guide applicator and method having improved application control and better definition of the resin type material which is applied over a desired arcuate and vertical area of the threads of the internally threaded article.

An additional object of this invention is to provide a Teflon coated threaded article for protecting or masking the threads from unwanted contamination or deposition of material thereon.

SUMMARY OF THE INVENTION

The above objects and other objects, which will become apparent in the description, are achieved by providing an apparatus and methods for applying resin type material to threaded articles, including fasteners such as nuts, having openings at both ends thereof. In one aspect of the invention a support is provided for receiving the threaded articles from the feeder and for supporting them in a substantially fixed relation for treatment.

Means is also provided for heating threaded portions of the articles to a temperature above ambient temperature and means are associated with each of the articles for directing particles of resin type material longitudinally through one of the openings of each of the internally threaded articles. The patricles are directed toward selected portions of the threads of the threaded articles to cause the resin type particles to be softened by heat from the threads and to build up a deposit on selected portions of the threads.

In one preferred embodiment a succession of internally threaded articles are conveyed by the support. The support has a plurality of rotatable platforms disposed thereon, one for receiving each of the internally threaded articles, and stationary means is located adjacent the path of the support contacting a portion of each of the platforms thereby causing rotation of the platforms. Heat fusible material is then deposited onto a desired circumferential segment of the threads during movement of the support along a predetermined portion of the path. The present invention also contemplates other means of relative motion between the threaded article and the source of resin type materials, such as the rotation of the material application means and using improved nozzle configurations. These means of relative motion provide selectable angular deposition, including three hundred sixty degree circular deposition, semicircular and quasi-circumferential deposition of the heat fusible resin type material. Vacuum means is provided adjacent one of the ends of the threaded articles to draw or suction air through the threaded portions, avoiding application of resin type particles in undesired areas of the threaded articles and to draw off resin type particles which have passed through the threaded portions.

In accordance with various forms of the present invention, an improved spray guide applicator is used for directing the resin type particles to the selected threads of the threaded article to deposit patches or rings of resin type material on the threads. Patches and rings, including complete rings and complete coverage of all the threads, by the selected resin type material are collectively called patches herein. Such improved spray applicators utilize relationships between the configuration of each of the spray applicators and their size (including adjustability of various nozzle features), as well as the size of the threaded article to receive the resin type material. These relationships provide for improved application and definition of the resin type material. Additional control of the patch formation is accomplished by using spray applicators which provide a gaseous jet discharge containing the resin type material with the gaseous jet output from a nozzle of the spray applicator toward the threads of the threaded article. The direction of flow of the gaseous jet in the portion of the conduit between the ends of the threaded article is substantially parallel to the longitudinal axis of the threaded article. The gaseous jet strikes an end plate which deflects the gaseous jet producing directions of flow at the opening of the nozzle substanially perpendicular to and radially extending from or about the longitudinal axis of the threaded article. In some forms of the invention the radial extension of the gaseous jet containing the resin type material particles about the longitudinal axis forms semicircular and circular layers of controllable thickness.

The present invention also provides new and improved processes for applying patches of resin to internally threaded articles having openings at one or both ends of the threaded portions. The processes include the cessation of conveying particles of resin type material through one of the openings of the threaded articles and causing the resin type material to impact against an area of each of the threaded portions with the resin type particles softened by heated threads and a deposit being built up. The invention in one of its alternate embodiments also contemplates turning each of the threaded articles and/or each of the spray guide applicators about the axis of its threaded portions, while directing resin type material through the nozzle openings in a predetermined arcuate angle. Additional control of patch coverage is also made possible by moving the threaded article and the applicator relative to another with respect to the longitudinal axis of the threaded article.

BRIEF DESCRIPTION OF THE DRAWINGS

For a fuller understanding of the nature and desired objects of this invention, reference should be made to the following detailed description taken in connection with the accompanying drawing, wherein like reference characters refer to corresponding parts throughout the several views of the preferred embodiments of the invention and wherein:

FIG. 2 is a sectional elevational view taken along the line II—II of FIG. 1, showing details of the structure of FIG. 1;

FIG. 3 is an exploded perspective elevational view, taken on an enlarged scale, showing elements forming a typical nut supporting platform in the structure of FIGS. 1 and 2;

FIG. 4 is a top plan view showing a typical nut supporting platform of the structure of FIGS. 1 and 2, taken on an enlarged scale to show further details of the elements;

FIG. 5 is an elevational sectional view taken along the lines V—V of FIG. 4; and also showing an adjacent vacuum hood;

FIG. 6 is a side view of the spray applicator for use with threaded fasteners having large size internal diameters;

FIG. 7 is a side view of a spray applicator of one of the present inventions for use with treaded fasteners having intermediate size internal diameters.

FIG. 8 is a side plan view of a spray applicator of one of the present inventions for use with threaded fasteners having small size internal diameters;

FIG. 9 is a perspective view of the spray applicator of FIG. 6;

FIG. 12 is a cross-sectional view of another embodiment of the apparatus of the present invention. This embodiment is similar to the embodiment of FIGS. 1 and 2, except that the powered resin is applied at one station only;

FIG. 13 is a top view of another embodiment of a spray applicator in which the nut is held stationary relative to the spray applicator that is rotated its axis;

FIG. 14 is a cross sectional view of the applicator shown in FIG. 13, taken along the line XIV—XIV. In this view, the gear is shown as disposed on the applicator so that it can be rotated in the apparatus shown in FIG. 14a;

FIG. 14a is a cross-sectional view of one embodiment of the present invention that can use the spray applicator shown in FIG. 14. As mentioned above, in this embodiment, the spray applicator is rotated while the threaded fasteners remain in a stationary position relative to the applicator;

FIG. 15 is a side elevational view, partially in cross-section of an embodiment of the apparatus of the present invention;

FIG. 16 is a side view of the embodiment shown in FIG. 15 with a cutaway view of the spray applicator stage;

FIG. 17 is a combination schematic/apparatus diagram for an embodiment of the apparatus providing control over patch coverage longitudinally along the threaded article; and FIG. 18 is an enlarged view of the spray applicator or the nozzle portion shown in FIG. 17, and FIG. 18B is a similar view to FIG. 18A with the spray applicator and coupled conduit moved relative to the fastener in the view of FIG. 18A.

DESCRIPTION OF THE PREFERRED EMBODIMENT

Figure 1:
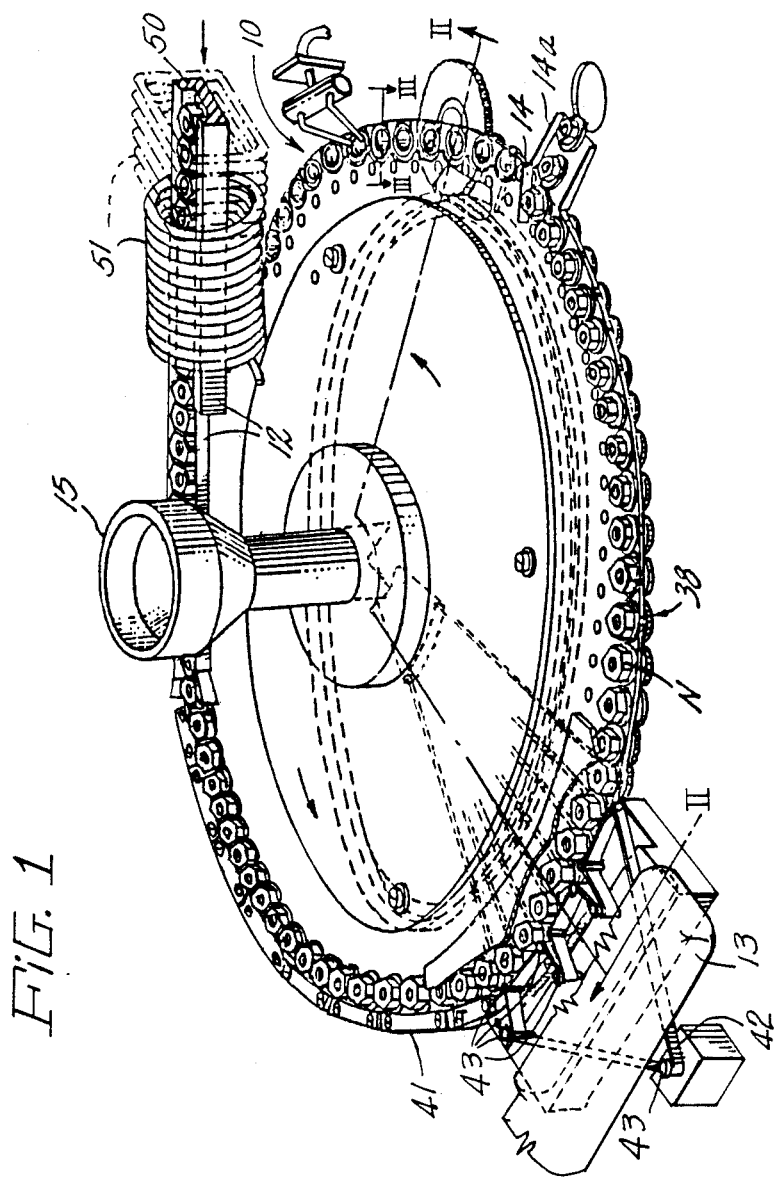
FIG. 1 is a perspective view showing a device for the manufacture of self-locking internally threaded fasteners employing a spray guide applicator constructed in accordance with the teachings of one of the present inventions.

Referring to the drawings, and in particular to FIGS. 1 and 2 as well as FIG. 12, there is shown apparatus for the manufacture of a self-locking internally threaded article in the form of a nut N, which generally comprises a rotatably mounted transport member in the form of a table 10 movable along a predetermined rotary path about its central axis, in the direction shown by the arrows of FIG. 1.

As the table 10 is continuously rotated about a fixed housing 11, a point on the table 10 will be seen to pass through a plurality of stationary work areas referred to as stages of the operation for the purposes of the present desription. In the first stage of operation loading chute 12, which is inclined downwardly toward the surface of the table 10, is effective to deposit a nut N onto the table 10. During the next stage a powdered material is applied through a spray operation to the internal threaded surface of the nut N. This stage is substantially enclosed by a vacuum hood 13, the operation of which is explained in detail below.

In the embodiment of FIGS. 1, 2 and 12, a single depositing spray stage is used, with the arcuate angular length of the application varying according to the amount of deposit desired. While a single powder application stage is shown herein, it will be appreciated that multiple powder application stages are also contemplated by the present inventions, depending on the type of deposit desired.

During the next stage an arm 14, connected to an inclined ramp 14a, and having a cam surface disposed adjacent the upper surface of the table 10 is effective to unload the nut N from the support structure 24 and convey it in an opening in the support structure. During a subsequent stage of operation, which substantially covers that portion of the table 10 located between the unloading station and the loading station, the means for applying resin type material to the nut N are purged of residual material, and are readied for the next sequence of operation.

Referring to FIGS. 1 and 2, the stationary housing 11 is provided with a funnel shaped hopper 15 which serves to receive the powdered resin type material for application to the internal threads of the nut N.

Referring to FIGS. 2 and 12, it will be noted that the table 10 is provided with a table hub 16 which receives a ball-bearing member 17. The stationary housing 11 is provided at its upper portion with a bearing surface 18 on which the table hub 16 and the ball-bearing member 17 are received.

The external surface of the housing 11 further provides a second bearing surface 20 on which is mounted a rotatable block 22. The rotatable block 22 rests on a ball-bearing unit 23 disposed on the upper surface of a support structure 24, which also supports the stationary housing 11.

It will be noted from FIG. 2 that the cylindrical portion of the stationary housing 11 on which the second bearing surface 20 is formed, is substantially perpendicular to the support structure 24. Therefore, the rotatable block 22 moves in a plane substantially parallel to the surface of the support structure 24. However, the cylindrical portion of the stationary housing 11 on which the bearing surface 18 is formed is slightly canted with respect to the surface of the support structure 24 providing for rotation of the table 10 in a plane forming a slight angle with the surface of the support structure 24 and the plane of rotation of the block 22.

The rotatable block 22 is provided with a ring gear 26 in meshing engagement with a gear 28 connected to a drive motor. Extending upwardly from the block 22 is a pin 29 which is slidably received in a cylindrical bore 30 formed in the table 10, It will therefore be evident from FIGS. 2 and 12, that operation of the motor to drive the gear 28 causes rotation of the block 22 which in turn drive the table 10 by virtue of the interconnected relationship between the pin 29, the table 10 and the block 22, It should further be evident that rotation of the block 22 and the table 10 causes the block 22 and the table 10 to move to various positions, such as, a distance where the two members are in close relation to one another and to a relative position where they are separated a maximum distance apart in the manner shown.

Referring to FIGS. 1, 2, 5 and 12, the block 22 is shown to have formed therein a plurality of circular cross-section apertures 32 each having an opening inwardly toward the stationary housing 11 and receiving a tube 33 at the opposite end, the tube 33 and the aperture 32 forming in combination a conduit means. Attached to the end of the tube 33 is a spray applicator 200 for controlling the application of resin deposits and which is discussed in more detail hereinafter.

Figure 10:
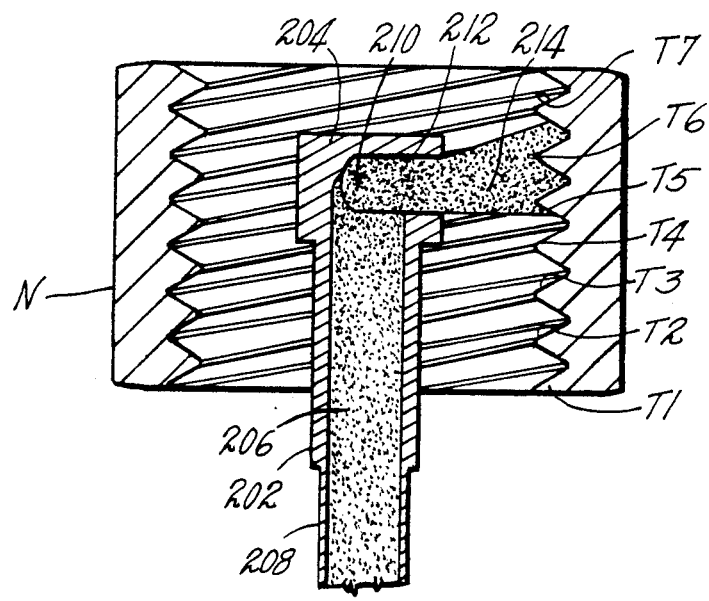
FIG. 10 is a cross-sectional view of the spray applicator with a gaseous jet of resin type material impacting the threads.
Figure 11:
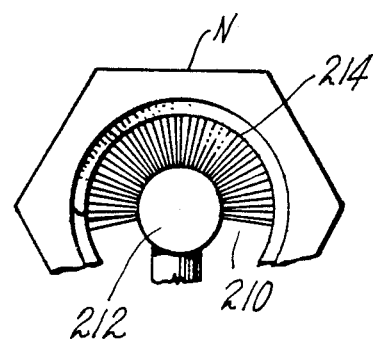
FIG. 11 is a top plan view of FIG. 10 showing the fan-like spread of the stream of resin particles.

Referring more particularly to FIGS. 6, 9 and 10, there is illustrated generally at 200 the spray applicator constructed in accordance with one form of the present invention. The applicator 200 comprises an elongated conduit portion or shaft 202 and a nozzle portion 204. These nozzle and conduit portions have a cylindrical passage 206 therein which is preferably concentric with the shaft 202. In FIG. 6, the cylindrical passage, (also the inner diameter of the conduit or shaft 202), is shown by the dotted lines. The passageway extends from a rear portion 208 of the conduit 202 to the nozzle portion 204 where it curves slightly upward at its entrance to the nozzle portion 204. The nozzle 204 is provided with a slot or opening 210 which communicates with the cylindrical passage 206. The nozzle portion 204 is preferably cylindrical in configuration having an end portion which forms a deflector surface 212. It has been discovered that varying the width W of the slot 210, as best seen in FIG. 6, enables varying the area of the resin deposit or patch applied. Control of the area coated, and thus the number of threads coated, permits improved masking of the internally threaded area, as well as improved definition of the applied resin type material. Control in this manner allows one to selectively avoid coating one or more of the leading threads, therefore maintaining certain threads free of resin particle deposit, providing improved torque performance and enabling easy assembly of the fastener with a mating member. This feature is illustrated in FIG. 10 where as shown the stream of resin particles 214 is controlled so that the initial threads T1, T2, T3 and T4, as well as the last thread T7 of fastener N are free of resin particle deposit while threads T5 and T6 are coated.

It has been determined that the arcuate width of the slot opening 210 is important in the control and velocity of the resin particle stream, as well as the arcuate coverage of the internal fastening threads. In accordance with one form of the present invention, it has been found that when the circumference of the slot opening is in the range of between about one hundred ten degrees to about three hundred ten degrees, an acceptable resin deposit or patch is applied, Spattering is further minimized, while optimum velocity is also maintained, when the circumference of the slot opening 210 is preferably in the range of between about one hundred eighty degrees to about three hundred degrees. The circumferential opening of the slot 210 is illustrated by the arrows 216 of FIG. 9.

It has also been determined that, in accordance with one form of the present invention, the proportional relationship of diameter of the nozzle to the minor or inner diameter of the fastener to be treated is also important in the deposition of the resin particles. The diameter of the nozzle should be sixty to eighty percent and preferably sixty-five to seventy-five percent of the inner diameter of the fastener to be treated to provide improved control and reduced spatter of the stream of resin particles applied to the internal threads. Accordingly, this form of the invention contemplates variations in the size of the diameter of the nozzle and its conduit portion relative to the size of the inner diameter of the fasteners to be treated.

The optimum diameter of the nozzle for the above embodiment, providing effective and effecient deposition of resin particles, as well as improved patch definition to attain improved torque performance, is approximately seventy percent of the inner, or minor, diameter of the fastener, Nozzles that are sixty to eighty percent of the inner diameter are within the operable range and provide acceptable applied patches. Examples of such variations in size of the nozzle diameter are illustrated in FIGS. 7 and 8. The applicator 200 of FIG. 6 represents a relatively large size diameter nozzle. The applicator 218 and the nozzle 220 of FIG. 7 represent generally an intermediate size configuration, and the applicator 222 and nozzle 224 of FIG. 8 represent generally the configuration of a form of the applicator 200.

The range of patch coverage for the arcuate internal threaded surfaces of a fastener is also somewhat sensitive to the adjustable depth of the slot or opening 210. For this particular embodiment it has been determined that such a relationship may be expressed as a percentage of the diameter of the nozzle portion 204 of the spray guide applicator 200. Specifically, in order to obtain a desirable patch of sprayed resin type material, the slot depth D is maintained at between about thirty percent to about eighty-five percent of the diameter of the nozzle portion 204. Further, it is preferred that the slot depth D be in the range of between about forty-five percent to about sventy-five percent of the diameter of the nozzle portion 204.

The cylindrical passageway 206 is constructed to be as large as possible (as illustrated by the dotted lines in FIGS. 6–9 inclusive) consistent with maintaining strength of the walls of the conduit portion 202. Larger passageways maximize the volume and amount or resin type material which can be directed through the conduit portion 202 while minimizing the amount of air or gas pressure and the velocity of air required to move the resin type material through the spray applicator 200. This feature improves the definition of the resin deposition area by reducing spattering caused in part by higher air pressures and velocities.

The spray applicators 200 of the illustrated form of the invention are preferably formed of metals and alloys which readily dissipate heat acquired by radiation or inadvertent contact with the heated fasteners. Construction using these materials reduces the adherence of resin type material on the walls of the applicator passageways and helps eliminate clogging or restricted flow. Aluminum and aluminum alloys are examples of suitable metals for forming the spray applicators 200. Applicators made of steel, for example, are generally less preferred since steel tends to hold the heat transferred from the fasteners with the result that clogging and restricted flow may occur. Accordingly, consistent with the principles of the present invention, the spray applicators 200 are maintained free from contact with the heated fasteners.

As shown in FIGS. 2, 3, and 5, the table 10 comprises an upper plate 35 and lower plate 34, the lower plate having a plurality of circular openings 36 formed about its periphery and the upper plate 35 having a plurality of semi-circular walls 37 forming the outer periphery adjacent the openings 36. The tube is in communication with each of the openings 36, and thus rotation of the table 10 and block 22 causes the tubes 33 and the connected applicators 200 to be moved upwardly through the openings 36 to a position shown at the left of FIG. 2 and downwardly to a position shown at the right of FIG. 2. This up and down movement is provided due to the angular orientation of the plate and block during rotation of table 10 and block 22, as described above.

As best shown in FIGS. 3–5, in one embodiment of the present invention, at each of the openings 36 in the lower plate 34, a pinion gear 38 is assembled by inserting a tubular flange 39 of the pinion gear 38 through the opening 36 from the underside of the plate 34. Locking ring 40 is then pressfit onto a flange 39 to attach the pinion gear 38 to the plate 34. The locking ring 40 is of a thickness to be received in a counter bore formed in the lower plate 34 such that the upper surface of the righ is flush with the top surface of the lower plate 34. Clearance between the opening 36 and the flange 39 is such that the pinion gear 38 is free to rotate when so assembled.

Referring now to FIG. 1, taken together with FIGS. 4 and 5, at selected arcuate segments of the path of circular rotation of the table 10 and the block 22, one or more racks 41 are disposed such that the teeth of the rack 41 are brought into meshing engagement with the teeth of the pinion gear 38 during rotation of the table and block combination. The rack 41 is mounted to the upper surface of the stationary support structure 24 as best shown in FIGS. 2 to 5. While the means for contacting the pinion gear 38 is shown herein as the stationary rack 41, it should be evident that such means could be a variety of interengaging structures. Such structures include, but are not limited to circular ring gears having internal teeth aligned to mesh with the pinion gear 38 at desired locations, or portions of such a gear employed in a similar fashion as the described racks.

In accordance with one form of the invention, means may be provided at the spraying stage, beneath the hood 13, to contact the outer flange face of the periphery of the nut N, while the nut N is being processed at the stage. As shown in FIG. 1, a silicone belt 42 is threaded over a plurality of pins 43 to form a substantially arcuate belt surface, conforming to the periphery of the flange on the nuts N, as they are rotated.

In operation the illustrated embodiment of FIGS. 1 and 2 employs the principles taught in U.S. Pat. Nos. 3,995,074, 4,054,688 and 4,100,882 in dispensing material from the funnel 15 to the exit point from the outer end of each of the tubes 33. Briefly stated, at the hopper 15 are provided preferred resin type materials including, but not limited to Teflon, Teflon compounds, resin powders, thermosetting resins, thermoplastics, nylon powders resin powders and similar sprayable powders. The powders are forced through the tubes 33 by fluid pressure generated by an air pump (not shown), the air pressure being introduced into the circular bore 45 in the housing 11. In the illustrated embodiment it is desired to provide continuous deposition of resin type material on the fastener throughout an arcuate segment of rotation of the table 10. Accordingly, as shown in FIG. 2, the table 10 includes an arcuate bore 48 provided in the housing 11 extending over an arcuate segment of rotation of the table 10 through the housing from the circular bore 45 to the circular aperture 32 when aligned with the arcuate bore 48.

Refering now to FIG. 1, a sequence of operational steps will be described in which it is desired to provide a locking patch over three hundred sixty degrees of a portion of the internal threads of the fastener element N. In practicing the teachings of the illustrated embodiment, fasteners N are fed from a vibrator device or similar orienting and feeding device (not shown) into a chute 50 which is surrounded by heating means, such as, a heating coil 51. The fastener N is raised to a temperature sufficient to cause a powdered resin type material to adhere to the threaded surface of the fastener when contacted thereby and fused by heat from the surface to form a continuous patch. As each fastener N approaches the table 10, the fastener will be deposited in registry with the semi-circular wall 37 of the plate 35 (see FIGS. 2 and 3).

In the described typical cycle operation, a plurality of the fasteners N are contained on a vibratory feeder or other device (not shown) which is effective to feed the fasteners into the chute 50 where they are passed through the heating coil 51 and raised to a temperature sufficient to cause a resin type material powder to adhere to the threaded surfaces of the fasteners.

Each fastener N is in turn located in a position as shown in FIGS. 4 and 5 wherein the flange of the fastener N is disposed on the surface of the table 10 adjacent the semi-circular wall 37, supported partially by the tubular flange 39 of the pinion gear 38 forming a rotatable platform for the fastener N. The fastener N is then passed into an area along the circular path of the table 10 wherein the circular cross-section aperture of the tube 33 is open to the arcuate bore 48, providing the flow of the resin type material through the bore and tube 33 and onto the threads of the flanged nut N.

In the instances where a patch is to be applied about the complete circumference of a portion of the internal threads of the nut N, (i.e. a three hundred sixty degree patch is desired), rotation of either the spray tubes and/or the nut to be processed can be accomplished in the embodiments shown in FIGS. 1, 4, 5, 13, 14 and 14a in order to obtain a satisfactory applied patch. In other instances, rotation of the nuts or spray tubes in not desired and resin is deposited on a portion of the three hundred sixty degree path of the internal threads, as described in detail above. Accordingly in one embodiment, rotation of the nut is accomplished as the nut N approaches the point where the aperture 32 of the tube 33 is positioned for flow of resin type material. Specifically, the pinion gear 38, on which the fastener N is resting, is brought into meshing engagement with the rack 41. The pinion gear 38 is then caused to turn, thereby rotating the fastener N during deposit of the resin type material and applying a three hundred sixty degrees patch about a desired portion of the threads.

In an alternate embodiment shown in FIG. 12, the structure and operation of the apparatus is similar to the embodiment shown in FIGS. 1 and 2. The apparatus is disposed upon a spacer 301 which supports a post 304. A gear 310 that is carried upon a horizontal ring tube 311 which rides upon a ball bearing 303 about a post 304. A horizontal tube 312 is fitted in an internal conduit 322 formed in the ring tube 311. One end of an elbow 313, generally formed of a plastic tubing material, is fitted on the end of the horizontal tube 312. The other end of the elbow 313 is fitted onto the spray applicator 315. The spray applicator 315 is rigidly disposed in a tube holder 314 that is affixed to the ring tube 311. Resin type particles that are to be applied to the threaded fasteners flow through a powder feed tube 321 that is canted at an oblique angle to the apparatus. As the powder emerges from the feed tube 321, the particles strike the generally conically shaped disperser 323 from whence it flows through a conduit 324 formed in the post 304. As the internal conduit 322 indexes in front of the conduit 324, powder will flow into it and thence into the tube 311 and finally into the spray nozzle portion 315. As the powder emerges from the mouth 315a of the nozzle portion 315, it impinges upon the nut N and deposits upon the threads as described previously.

Figure 14B:
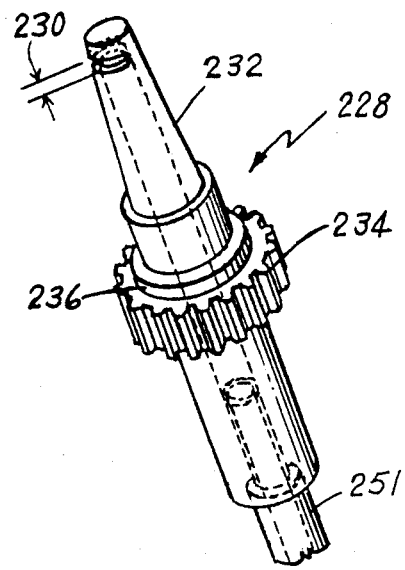
FIG. 14b is a perspective view of the spray applicator and gear shown in FIG. 14.

In another embodiment as illustrated in FIGS. 13, 14 and 14b, a three hundred sixty degree patch application can be achieved by rotation of a spray guide applicator 228 through which the powdered material is sprayed. In this regard the spray applicator 228, has a nozzle opening 230 and a coupled conduit portion or shaft 232, and further included is a pinion gear 234. The pinion gear 234 is press fit over the end, opposite the nozzle opening 230 and is positioned on the shaft 232 so as to abut a shoulder 236 on the shaft 232.

As can be seen in FIG. 14a, the pinion gear 234 is rotated as it approaches the point at which an aperture 250 of a tube 251 is positioned for flow of resin type material, so as to apply a three hundred sixty degree patch or ring to a portion of the internal threads of the fastener N. This operation is similiar to that described above in reference to FIGS. 4 and 5. Specfically, the pinion gear 234 is brought into meshing engagement with a rack 237 which causes the pinion gear 234 and an attached spray guide applicator 238 to rotate within the fastener N. The rack 237 includes a pawl and spring (not shown) which together act as an expandable guide path for accepting the pinion gear 234 and preventing backward motion. Construction in this manner helps to alleviate path alignment problems which could be caused by misalignment of the pinion gear 234 and the rack 237.

This spraying operation described above takes place for at least one complete rotation of the spray applicator 228 over a predetermined arcuate path of travel of table 211 in FIG. 14A so that a three hundred sixty patch or ring of minimum acceptable thickness is applied to a portion of the internal threads of fastener N. It should be understood that powder flow can be adjusted during the spraying operation to adjust the amount of the resin type material deposited on the fastener during that time period. Such adjustment of powder flow accordingly determines the thickness of the patch which will be applied to the fastener threads.

As previously described with reference to FIG. 2, the arcuate bore 48 is designed and fabricated to include that arcuate portion of the table rotation adequate to cover the desired portion of the internal threads on which the patch is to be deposited, taking into account the rotation of each fastener N or the spray applicator 200 relative to the rotation of the table 10. As an example, if it is desired to deposit a patch covering the full three hundred sixty degrees of a portion of the internal fastener threads, the arcuate bore 48 will be disposed over an arc through which the table 10 travels during at least one rotation of the fastener N or rotation of the spray applicator 200 through three hundred sixty degrees.

While covering the full three hundred sixty degrees of a portion of the internal fastener threads is preferred in certain instances, a fastener satisfactory for selected purposes, such as acceptable torque performance and patch definition, can be accomplished by covering less than three hundred sixty degrees of the fastener threads. It has been determine, for example, that satisfactory torque performance can be obtained from an internally threaded fastener being used one time by having thread coverage in the range of between about ninety degrees to three hundred sixty degrees. More preferably, for internal arcuate thread coverage a range of from about between one hundred ten degrees to about two hundred seventy degrees is often best.

In the situation where the fastener will be subject to reuse, it has been determined that internal arcuate thread coverage in the range of between about one hundred thirty degrees to three hundred sixty degrees provides satisfactory torque performance. A more preferred range for reusable fasteners is between about one hundred eighty degrees to two hundred seventy degrees of internal arcuate thread coverage.

In another embodiment of the invention shown in FIG. 17, the patch of resin type material is applied to the threads of a threaded article 346 having at least one open end and typically open at both ends, such as for nuts. The apparatus includes means for supporting the threaded article 346, such as, for example, a simple mounting shelf 350 as shown in FIG. 17. Heating means is provided to heat the threaded article 346 to the temperature needed to cause adherence of the resin type material to the threads. The temperature of the threaded article 341 is sensed in a known manner by an optical pyrometer 353 and coupled fiber optic sensor 349. In the illustrated embodiment the heating means is an RF induction heating coil 352. A nozzle portion 354 shown in FIG. 18 is also provided for spraying the resin type material onto the threads. The sprayed type material which does not adhere to the threaded article 346 is removed by suction means, such as vacuum nozzle 355 shown in phantom in FIG. 17. Various means can be used for generating the gaseous jet containing the resin type material. A stream of gas for producing the gaseous jet is provided by an air input 349 and coupled flow meter 351 generating the desired gaseous jet which combines with the resin type material. Additional details of the source and control of resin type material will be discussed hereinafter.

In FIG. 18 are shown details of the configuration of the nozzle portion 343. A cylindrical conduit 356 and an end plate 358 of the nozzle portion 354 cause the gaseous jet containing the resin type material to pass along path P through the conduit 356 disposed between the open ends (or the two open ends of a nut) of the threaded article, and path P is substantially parallel to the longitudinal axis of the threaded article 346. The gaseous jet then continues along the path P until striking the end plate 358. The gaseous jet is diverted along path D toward the threads of the internally threaded article 346. The directions of flow of the gaseous jet at nozzle opening 360 after diversion along path D are substantially perpendicular to and radially extending about the longitudinal center line of the threaded article 346. In a preferred embodiment the gaseous jet is diverted along path D, forming a substantially circular thin layer at the nozzle opening 360. The longitudinal extent of the layer is controllable by varying the size of the nozzle opening 360, such as by using a set of different fixed opening sizes of the nozzle 354 or by having continuous variability of the nozzle opening 360 through displacement of the end plate 358 relative to the terminal end of the conduit 356. Means for accomplishing this relative displacement can include, for example, a threaded drive shaft 362 coupled to the end plate 358, a hydraulically driven form of the drive shaft 362 or other equivalent means for relative displacement of the conduit 356 and the end plate 358. Additional control of the shape of the gaseous jet emerging from the nozzle opening 360 includes changing the angle of radial inclination of the end plate 358. In a preferred form of the invention this angle of inclination, alpha, shown in FIG. 18B, is approximatly two degrees in order to avoid overspray onto undesired portions, such as the face portions at either end of nuts.

Relating to the above mentioned adjustability of the nozzle opening 360, there is included means for selectively moving and controlling the spatial position of the nozzle portion or spray applicator 354 illustrated in detail in FIG. 18. At the beginning of an operational duty cycle of forming a patch, the internally threaded article 346 is first positioned to establish the terminal end of the nozzle portion 354 at the position shown in FIG. 18A. The apparatus is actuated by an operator 364 or by an automatic control 365 (shown schematically) applying electrical power to a solenoid operated directional valve 366. The direction valve 366 accomplishes movement fo the nozzle portion 364 into the opening of the internally threaded article 346 by air input from the directional valve 366 to an air drive cylinder 368 coupled to the applicator portion 364. Activation of the apparatus and/or movement of the drive cylinder 368 is also coupled through a relay 370 to a powder dispenser 372 and associated electric vibrator 373 and also to an air spray unit conduit 374. This coupling of components enables delivery of powdered resin type material from the powder dispenser 372 and generation by the air spray unit 374 of an air stream. The powder and air stream are then combined in the conduit 356 to form a gaseous jet containing the resin type material. As discussed hereinbefore, the gaseous jet is output along the path P shown in FIG. 18B, striking the end plate 358, and the powdered resin type material in the gaseous jet is diverted along path D to the threads of the threaded article 346 to form the patch thereon.

The rate and direction of travel of the nozzle portion 354 along the longitudinal axis of the threaded article 346 can be controlled by the pressure level, as regulated by flow control valve 375 for forward motion and flow control value 376 for rearward motion. To vary the length of travel for the nozzle portion 354, microswitches 378 and 380 are used in the illustrated embodiment to determine the reverse motion and stop positions, respectively, for the air drive cylinder 368 coupled to the nozzle portion 354. At the end of the chosen duty cycle the microswitches 378 and 380 also can deactivate powder flow from the powder dispenser 372 and flow of the gaseous jet. The end of the dury cycle can be, for example, at the end of the forward stroke position of the drive cylinder 368 or can be at the return to the starting position, or multiples of the selectable positional ranges.

In another form of the invention other means for controlling start, reverse motion and stop positions for the drive cylinder 368 can be used, such as, for example, a plurality of microswitches or a rheostat positionally coupled to the location of the drive cylinder 368 to enable carrying out a voltage controlled duty cycle for the nozzle portion 354. Moreover, such means can be coupled to the flow control valves 374 and 376, enabling the velocity of the drive cylinder 368 to be controlled throughout the range of the duty cycle. This feature allows careful control of relative amounts of resin type material deposited along the length of the threads encompassed by the duty cycle.

A particularly advantageous use of the embodiment of FIGS. 17 and 18 is the application of a Teflon type patch, preferably covering all the threads of the threaded article 346. A thermoplastic type Teflon, such as Teflon-P powders (see Du Pont Technical Information Pamphlet TI-13-84, incorporated by reference herein) is sprayable onto the heated threads forming a Teflon patch. The threaded article 346 undergoes the aforementioned processing steps with the gaseous jet containing the Teflon-P powders sprayed from the nozzle 354 onto the threads. The threaded article 346 is raised to a temperature of about 700° F. by an RF generator, and a substantially pinhole free Teflon covering is achieved with a layer thickness being at least about 25 to 50 microns. In an average case the thickness at the root and crest of the threads was about 20 to 30 microns. In preparing the Teflon coatings it was found to be unnecessary to perform the recommended Du Pont post preparation heat treatment (see Du Pont Pamphlet TI-13-84 indicated above). A finished substantially uniform, pinhole free Teflon covering was obtained in most instances directly from the spray application process, but in some cases, such as for small nuts which cool rapidly, it is desirable to perform a post layer formation step of pulse heating at about 700° F. for a few seconds to achieve better Teflon coating integrity and performance characteristics. It should be understood that any short heat treatment based on known methods and apparatus can be used to perform this post deposition heat treatment.

The current commercial grade Du Pont Teflon-P powders have an average size of about thirty-seven microns and a size range from one to one hundred microns. Different size distribution Teflon-P powders are also available from Du Pont Corp. Although Teflon-P powder from Du Pont Corporaiton is preferably used for preparing the desired Teflon coatings, other similar formulations of powders having substantially the same chemical makeup and particle size distribution can be used with equal effectiveness.

Fasteners prepared in accordance with the above described procedure have found particularly significant use in joining treated structual members to other structures. Recent progress has been made in improving the corrison resistance of automobile bodies using formulations for treatment of steel structural members, such as, for example the PPG Corporation Uniprime coating product (Uniprime is a trademark of PPG Corporation). When treating an automobile structual member using Uniprime, the cured material forms a protective layer over the underlying metal. When a fastener coupled to the structural member is engaged with its mating fastener and the threads of the coupled fastener or the mating fastener are coated with Uniprime, it is virtually impossible to obtain the proper fastener tension in the standard assembling operation involving the torque-tension measurement on the fastener coupling. A proper torque-tension curve or test incures achievment of a prescribed range of bolt or fastener tension for a fastener coupling. However, the presence of the Uniprime layer can result in many problems, such as stalling of the bolt driver and result in unknown bolt tension. The Uniprime layer can also undērgo cracking and separation, causing anomalous torque-tension reslults. A mask layer can be placed over the threads to prevent contamination from Uniprime, as well as to prevent other interferring, or extrinsic, contaminants from being deposited on, or remaining on the threads by enabling ready removal from the threads. A properly prepared mask layer can thereby insure a reliable torque-tension curve result for fastener couplings. The Teflon coating, however, should be reliably and uniformly placed over all the threads, but preferably not on other fastener surfaces which are often desirably coated with Uniprime or other corrosion preventative materials or with finish coatings. Other methods have been tried and have been unsuccessful, particularly for internally threaded articles. Due to the low viscosity, liquid application of the Teflon covering to internal threads causes highly irregular coverage, and for external threads on bolts only electrostatically charged liquids have heretofore found success. The Teflon covering must not only be uniform in thickness but should be substantially free of pinholes in order to avoid deposition of on the threads small quantities of Uniprime, or deposition on the threads of other extrinsic contaminants which cannot be readily removed from the threads. Using the above described powder spraying techniques and apparatus, the desired substantially uniform Teflon type covering can be provided, enabling highly reliable torque-tension tests or curve. The ability to carry out such reliable tests achieves a high yield of fastener coupling with the desired strengths and much higher commercial production efficiency. Various types of fasteners can be coupled to a structural member and can benefit from the invention. These fastener types can include, for example, nuts, studs, bolts, internally threaded wells and an internally and externally threaded bolt.

In general the preferred form of the invention includes vacuum means, such as a hood shown in FIG. 1, for producing a suction force or a negative pressure at the vacuum nozzle 355 in the embodiment of FIG. 17. The vacuum means functions in a manner similar to those systems disclosed in the aforementioned prior art, serving to remove excess material during the application of a patch. One main requirement of such vacuum producing means is to provide a negative pressure or suction area adjacent the upper opening of internally threaded fasteners for drawing air in through the opening at the lower end to reduce deposition of resin type materials which have passed through the threaded portion of the fasteners.

FIGS. 15 and 16 illustrate another embodiment of the invention. Specifically, a single unit apparatus is shown for preparing nuts one at a time and is illustrated generally at 400, and includes a chamber 402 into which air is directed at one end through inlet 404. Chamber 402 includes a passageway 406 extending substantially across its length. A powder funnel 408 is positioned proximate to the inlet 404 and in communication with the passageway 406 of the chamber 402. The chamber 402 also includes an air exit port 410 at its end opposite that of the inlet 404 to which one end of a the conduit 412 is removably attached through a mounting structrure, such as threaded sleeve 414. The opposite end of the conduit 412 is attached to any applicator G of the spray applicators described hereinbefore. Specifically, a spray applicator similar to the spray applicaotr 218 of FIG. 7 is illustrated; however, any size applicator G can be substituted depending on the size of the nut N being processed.

The spray applicator G is directed through a nut support 416 on which a fastener or nut N is placed for processing. A vacuum hood 420 is typically placed generally over nut N and in association with a vacuum source (not shown), completing the air flow path through the apparatus thereby collecting powder which is not deposited on the internal threaded surfaces of the nut.

In operation hte powder funnel 408 is provided with a source of resin type material powder to be applied to the nut N. The powder is entrained in the air stream or gaseous jet provided at the inlet 404 and is carried through the passageway 406, the exit port 410 and the conduit 412 to arrive at the spray applicator G. The air entrained powder is then directed onto a predetermined portion of the arcuate internal threaded surfaces of the nut N for application thereto. Any powder not applied to the nut N is directed out of the internal area of the nut N by the vacuum hood 420. The resin patch is applied to the nuts N in a more consistent, controllable and cost efficient manner.

Accordingly, an apparatus and process for making locking nuts is provided which applies a resin type material patch to a predetermined area of the threads of a threaded article leading to improved performance characteristics, as well as improved patch definition. In particular, a Teflon patch can be applied to the threads of threaded articles achieving a substantially uniform, pinhole free covering enabling highly reliable torque tension tests to be performed on fasteners coupling corrosion treated structural members, such as are present in automobiles.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted in an illustrative and not in a limiting sense.

What is claimed is:

1. A process of directing at least one of a thermoplastic masking, insulating and lubricating type material to the threads of an internally threaded article having an opening on at least one end, comprising the steps of:
    supporting said threaded article for treatment;
    heating said threaded article to a temperature sufficient to enable said material to adhere to the threads of said threaded article;
    inserting said nozzle into the opening of said threaded article;
    discharging a gaseous jet containing said material from said nozzle toward the threads of said threaded article; and
    depositing said material onto the heated threads of said threaded article and accumulating said material on the threads to form at least one of a substantially uniform masking, insulating and lubricating coating.

2. The process as defined in claim 1 wherein said coating comprises a substantially uniform, pinhole free thermoplastic Teflon coating.

3. The process as defined in claim 2 wherein said Teflon coating has a thickness of at least about 25 microns.

4. A process of directing a stream of a Teflon type material to the threads of a threaded article comprising the steps of:
    movably supporting said threaded article for treatment;
    heating said threaded article to a temperature sufficient to enable said Teflon type material to adhere to the threads of said threaded article; and
    discharging said stream of Teflon type material toward the threads of said threaded article, said threaded article moved relative to said stream to form at least one of a substyantially uniform masking, insulating and lubricating layer of said Teflon type material, said layer having a thickness of at least about 20 microns.

5. The process as defined in claim 4 wherein said thermoplastic type Teflon powder consists essentially of Teflon-P.

6. The process as defined in claim 5 wherein said Teflon-P powder has a mean diameter of about 40 microns.

7. The process as defined in claim 4 further including the step of pulse heating said threaded article having said Teflon type covering.

8. The process as defined in claim 7 wherein said step of pulse heating comprises heating said Teflon type covering to about 700° F. for several seconds.

9. A process of directing at least one of a thermoplastic masking, insulating and lubricating type material sprayed from a nozzle to the threads of an internally threaded article having openings at both ends, comprising the steps of:
    supporting said treaded article for treatment;
    heating said threaded article to a temperature sufficient to enable said material to adhere to the threads of said threaded article;
    inserting said nozzle and coupled conduit into one of the openings of said threaded article;
    discharging said stream of material from said nozzle toward the threads of said threaded articles, the direction of flow of said steam in the portion of said conduit disposed between the open ends of said threaded article being substantially parallel to the longitudinal axis of said threaded article and the direction of flow of said stream at the opening of said nozzle being substantially perpendicular to and semicircularly radiating from and lying in a thin semicircular layer contered on the longitudinal axis of said threaded article; and depositing said material onto the heated threads of said threaded article and accumulating said material on the threads to form at least one of a masking, insulating and lubricating coating.

10. A process of directing a Teflon type material sprayed from a nozzle to the threads of an internally threaded article having openings at both ends, comprising the steps of:

supporting said threaded article for treatment;

heating said threaded article to a temperature sufficient to enable said Teflon type material to adhere to the threads of said threaded article;

inserting said nozzle and a coupled conduit into one of the openings of said threaded article;

discharging a gaseous jet containing said Teflon type material from said nozzle toward the threads of said threaded article, the direction of flow of said gaseous jet in the portion of said conduit disposed between the open ends of said threaded article being substantially parallel to the longitudinal axis of said threaded article and the direction of flow of said gaseous jet at the opening of said nozzle being substantially perpendicular to the longitudinal axis and forming a thin circular layer about the longitudinal axis of said threaded article; and depositing said Teflon type material onto the heated threads of said threaded article and accumulating said Teflon type material on hte threads to form at least one of a masking, insulating, and lubricating patch.

11. The method as described in claim 10 wherein said thin circular layer can be selectable layer thickness.

12. A method of covering with at least one of a thermoplastic masking, insulating and lubricating type material substantially all the threads of an internally threaded article having at least one opening, comprising the steps of:

supporting said threaded article for treatment;

heating said threaded article to a temperature sufficient to enable said material to adhere to the threads of said threaded article;

discharging a stream of said material toward the threads of said threaded article, the stream having a flow direction at the opening of said nozzle substantially perpendicular to and semicircularly extending about the longitudinal axis of said threaded article; and depositing said material onto the heated threads of said threaded article, said threaded article and said nozzle rotatable relative to one another enabling coverage of substantially all the threads of said threaded article to form at least one of a masking, lubricating and insulating covering.

13. A method of directing a stream of Teflon type material to the threads of an internally threaded article having openings at both ends, comprising the steps of:

supporting said threaded article for treatment;

heating said threaded article to a temperature sufficient to enable said Teflon type material to adhere to the threads of said threaded article;

discharging said stream of Teflon type material toward the threads of said threaded article; and depositing said Teflon type material onto the heated threads of said threaded article and accumulating said Teflon type material on the threads, forming a substantially uniform Teflon covering having a thickness of at least about 20 microns to about 50 microns to at least one of mask, lubricate and insulate the threads of said threaded article.

14. The method of claim 13 wherein said step of discharging said stream further comprises generating selectable directions of flow for said stream resulting in changeable longitudinal length for said Teflon covering.

15. the method of claim 13 wherein said Teflon covering maintains its insulating character for at least two seconds at 500 volts potential applied thereto.

16. The method as defined in claim 13 further including as additional step after said depositing step of pulse heating said threaded article with said Teflon type material thereon.

17. The method as defined in claim 16 wherein said step of pulse heating comprises heating said Teflon type material to about 700° F. for about 2 to about 5 seconds.

18. A method for covering with fluorocarbon type material substantially all the threads of an internally threaded article having openings at both ends, comprising the steps of:

supporting said threaded article for treatment;

heating said threaded article to a temperature sufficient to enable said fluorocarbon type material to adhere to the threads of said threaded article;

moving a nozzle having selectable nozzle opening dimensions and said threaded article relative to one another and selectively discharging a stream of said fluorocarbon type material from said nozzle toward the threads of said threaded article, said stream having a flow direction at the opening of said nozzle substantially perpendicular to and substantially circularly disposed about the longitudinal axis of said threaded article; and depositing said fluorocarbon type material onto the heated threads of said threaded article during said step of relatively moving said nozzle and said threaded article to cover substantially all the threads of said threaded article and form at least one of a masking, lubricating and insulating covering.

19. The method as defined in claim 18 wherein said step of depositing includes forming a substantially uniform covering of said fluorocarbon type material on the threads of said threaded article.

20. The method of claim 19 wherein said substantially uniform covering comprises a Teflon layer having a thickness of at least about 20 to 50 microns.

21. A process of applying Teflon type covering onto the threads of an internally threaded article having at least one open end, the process using a thermoplastic type Teflon powder sprayed onto the threads, comprising the steps:

movably supporting said internally threaded article for treatment;

heating said internally threaded article to a temperature sufficient to enable said Teflon powder to adhere to the threads and form said Teflon type covering;

positioning a movable spray applicator adjacent said movably supported internally threaded article;

discharging a gaseous jet containing said thermoplastic type Teflon powder from said movable spray applicator onto the threads of said internally threaded article, said spray applicator and threaded article moved relative to one another to form at least one of a masking, lubricating, and insulating Teflon type covering having a substantially uniform layer which is at least about 20 microns to about 50 microns thick.

22. The process as defined in claim 20 further including the step of pulse heating said threaded article having said Teflon type covering.

23. A substantially uniform coating of Teflon type material on a threaded article the product prepared by directing a stream of thermoplastic type Teflon powder to the threads of said threaded article, said product prepared in accordance with a process comprising the steps of:
supporting said threaded article in a position to receive said Teflon type powder;
heating said threaded article to a temperature sufficient to enable said Teflon type powder to adhere to the threads of said threaded article;
discharging said stream of Teflon type powder toward the threads of said threaded article; and
depositing said Teflon type powder onto the heated threads of said threaded article for a length of time sufficient to create a substantially uniform Teflon type layer resistant to the deposition of corrosion resistant material for at least one of masking, lubricating and insulating the threads of said threaded article.

24. The product as defined in claim 23 further including an additional step of pulse heating said Teflon coating for a time of at least about 2 seconds at a temperature between about 600° F. and 700° F.

25. The product as defined in claim 24 wherein said step of pulse heating comprises applying an RF field using an RF generator disposed about said threaded article.

26. The product as defined in claim 23 wherein said Teflon powder consists essentially of Teflon-P material.

27. The product as defined in claim 26 wherein said Teflon-P material includes Teflon-P particles having a mean diameter of about 37 microns and a range of about 1 to 100 microns.

28. The product as defined in claim 23 wherein said Teflon type layer thickness is at least about 20 to about 50 microns.

29. the procudt as defined in claim 23 further including the step of applying suction in the vicinity of said threaded article and removing the excess of said deposited Teflon powder not attached to said threaded article.

30. A process of directing a fluorocarbon type material to the threads of an internally threaded article having an opening on at least one end, comprising the steps of:
supporting said threaded article for treatment;
heating said threaded article to a temperature sufficient to enable said fluorocarbon type material to adhere to the threads of said threaded article;
inserting said nozzle into the opening of said threaded article;
discharging a gaseous jet containing said fluorocarbon type material from said nozzle toward the threads of said threaded article; and
depositing said fluorocarbon type material onto the heated threads of said threaded article and accumulating said fluorocarbon type material on the threads to form at least one of a substantially uniform masking, insulating and lubricating coating.

* * * * *